– – –

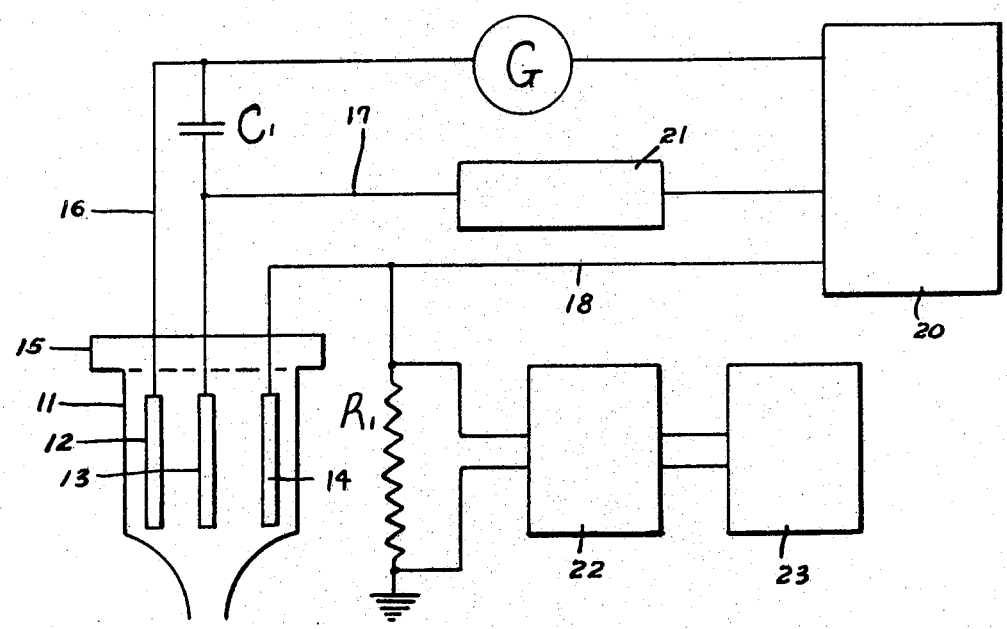

3,486,998
CONTROLLED POTENTIAL COULOMETER
Douglas E. Sellers, Centerville, Ohio, and David W. Rickman, Hamden, Conn., assignors to Monsanto Research Corporation, St. Louis, Mo., a corporation of Delaware
Filed Aug. 23, 1967, Ser. No. 662,636
Int. Cl. B01k 3/00; G01r 27/22
U.S. Cl. 204—195
3 Claims

ABSTRACT OF THE DISCLOSURE

This invention relates to an improved controlled-potential coulometer which eliminates instrument drift and improves the precision and accuracy of the analyses. The device consists of a cell, a capacitor, a means of determining the output of the cell, and the electrical circuitry to control the potential of the cell.

BACKGROUND OF THE INVENTION

The invention described herein was made in the course of, or under, Contract AT-33-1-GEN-53 with the U.S. Atomic Energy Commission.

This invention relates to an improved controlled-potential coulometer, an analytical instrument which quantitatively determines specific anions, or cations, or organic compounds by oxidation-reduction methods.

In the analytical laboratory accurate analyses are required for process control, material balances, and for other purposes. Many standard techniques and procedures fail in one or more ways to determine the composition of samples with a high degree of precision and accuracy in a short time. Controlled-potential coulometry, however, has already been shown to be an ideal technique for many analyses. Recent electronic developments have improved the coulometric method of analysis such that one anion or cation can be selectively determined in the presence of other ions with different oxidation-reduction potentials. A coulometer used in controlled-potential coulometry should be accurate, linear in response, capable of following rapid changes in current, and easily constructed.

Existing coulometers fail in one or more of these requirements—the most serious faults are:

(1) Because of instrument drift the existing coulometers are not precise and accurate,
(2) The existing coulometers require several hours for calibration,
(3) Frequent recalibration is necessary during the course of a work day, and
(4) Occasionally, electronic oscillation in the system causes erroneous results during the analysis.

Some of the other problems with the existing coulometers have been overcome by the use of solid state circuitry. However, there is a need for an improved coulometer to overcome the problems described above, particularly those of long and frequent calibration by eliminating instrument drift, and those of oscillation by providing a circuit that is more electronically stable under the conditions of use.

SUMMARY

One object of the present invention is to provide an improved coulometer to improve the precision and accuracy of the analyses.

Another object of the present invention is to provide an analytical coulometer in which excessive instrument drift and calibration time are eliminated.

Yet another object of the present invention is to provide an improved controlled-potential coulometer that eliminates electronic oscillation.

These and other objects are obtained by an improved controlled-potential coulometer comprising a cell containing a cathode, an anode and a reference electrode, means for determining the output of the cell, and electrical circuitry connecting to the electrodes of the cell to control the potential, the improvement which comprises interposing a capacitor between the anode and the reference electrode in the circuitry so that the capacitor matches the operating characteristics of the cell.

The following examples are given in illustration and not as a limitation on the scope of the invention.

DESCRIPTION OF THE DRAWING

The figure is a schematic of the present coulometer showing the relationship of the coulometric cell and the electronic circuitry.

DESCRIPTION OF THE PREFERRED EMBODIMENT

Referring now to the figure, the coulometric cell 11 is a suitable vessel containing anode 12, reference electrode 13 and cathode 14, the electrical leads of which pass through a non-conductive cover 15. The lead 16 from anode 12 is attached to the electronic circuitry 20. A shunted galvanometer G is attached to lead 16 to indicate the direction of current flow. The lead 17 from reference electrode 13 goes through a variable potentiometer 21 and to the electronic circuitry 20. The lead 18 from the cathode 14 goes directly to the electronic circuitry 20. One side of a standard resistor $R_1$ is attached to lead 18 and the other side goes to ground. The voltage derived from the current through the standard resistor $R_1$ is measured by a voltage-to-frequency converter 22 and a six decade scaler 23. A capacitor $C_1$ is interposed between the anode 12 and the reference electrode 13 in the circuitry by connecting it across leads 16 and 17.

Th coulometric titration cell 11, including the anode 12, reference electrode 13 and cathode 14, is well-known in the art [Schultz, W. D. and Thomasson, P. D., anal. chem., 31, 492 (1959)].

The use of the electronic circuitry 20 and the variable potentiometer 21 is well-known in controlled-potential coulometry. The potentiometer 21 is used to set the voltage between the reference electrode 13 and the cathode 14. The electronic circuitry 20 is used to supply approximately 50–150 milliamperes of current to anode 12 at a voltage up to approximately 3 volts. The direction of the current flow is dependent upon whether the cell is being used to oxidize or reduce the ions in solution. More or less voltage and amperage might be used with concurring changes in the background characteristics of the cell.

The current through the cell is measured by a system consisting of a standard resistor $R_1$, a voltage-to-frequency converter 22 and a six decade scaler 23. The standard resistor $R_1$ used in the present invention was a 10 ohm, 10 watt resistor with an accuracy of 0.05 percent. The voltage derived from the current through the standard resistor $R_1$ was measured by using a voltage-to-frequency converter 22, in conjunction with an electronic counter 23. Another electronic counter was connected to the converter output and served as an accurate current meter for determining titration cutoff currents. Other modifications might be made to this method of determining the output of the cell that would occur to one skilled in the art.

The critical component of this invention is capacitor $C_1$, which is interposed between the anode 12 and the reference electrode 13 across leads 16 and 17 in the circuitry. By placing the capacitor in this position, the operating characteristics of the cell are matched with the operating characteristics of the electronic circuitry. The capacitor was found to work well with both the mercury and platinum cells, but the instrument lost stability when the capacitor was removed, and in some cases the system began to oscillate. The capacitor must match the operating characteristics of the cell, which in turn, are influenced by the physical characteristics of the cell and the chemical nature of the solution being analyzed. By using a variable capacitor a single adjustment to meet the operating characteristics of the cell is all that is needed to obtain accurate readings which are not subject to electronic oscillations and aids in the accuracy and precision of the analysis.

A series of iron and uranium titrations using both a mercury and a platinum gauze cell in the coulometer indicated that the precision and the accuracy of the analysis was excellent as shown in the following example:

To analyze a solution containing uranium and iron a titration cell was built by attaching a 50 milliliter glass beaker to a three-way glass stopcock. A platinum wire contact was inserted through the glass wall of the beaker near the bottom. Triple-distilled mercury was placed in the titration cell to cover the platinum wire contact. The other end of the platinum wire was connected to lead 18; thus, the mercury pool formed the cathode 14 of the coulometer cell.

The reference electrode 13 was a fiber junction, saturated calomel electrode that was modified slightly to prevent chloride contamination. The restricted portion of the electrode reservoir was filled with an agar-saturated potassium nitrate gel, thus forming a nitrate salt bridge. Saturated potassium chloride solution was added on top of the gel, and the top of the electrode was replaced. The resistance of the electrode was less than 10,000 ohms as measured with a conductivity bridge.

The anode was a typical electrode used in this type of analysis. It consists of an unfired quartz tube closed at one end, and filled with one normal sulfuric acid. A platinum wire extended from lead 16 into the sulfuric acid.

To match the operating characteristics of the electrical circuitry with the operating characteristics of the coulometric cell for a uranium and iron analysis, a 0.022 microfarad capacitor was interposed between the anode 12 and the reference electrode 13 across leads 16 and 17.

Standard uranium (VI) and iron (III) solutions were prepared by dissolving weighed amounts of high purity $U_3O_8$ and iron metal in a minimum amount of concentrated nitric acid. This mixture was then diluted to one liter using 1 N $H_2SO_4$. Before weighing, the $U_3O_8$ was heated in a muffle furnace at 900° C. for one hour.

Other solutions were prepared from C.P. grade chemicals which were used without further purification. All dilutions were made with de-ionized water. High-purity argon was used directly for purging solutions.

Three milliliters of 1 N $H_2SO_4$ and seven drops of saturated sulfamic acid solution were then added. A stirring motor operating at 1800 r.p.m. with a glass-disk type stirrer was used to stir the solution and the mercury cathode. The glass stirrer was positioned at the mercury-solution interface to give maximum stirring of the solution and mercury surface without splashing. The reference electrode and anode compartment were positioned as close as possible to the mercury cathode without making direct contact and without being hit by the stirrer. In this manner smaller solution volumes were accommodated, resulting in shorter titration times. Next, a one milliliter aliquot of the sample solution was pipetted into the cell, the stirrer was turned on, and the solution was degassed with argon for 10 minutes. The tip of the argon inlet tube was positioned 4 to 5 mm. above the solution surface, and the argon flow rate adjusted so that the stream of argon produced a discernible depression in the solution surface. After the solution was degassed, the control potential of the mercury cathode was set at −0.04 volt and the titration was allowed to proceed until the cell current had decreased to 50 microamperes; the coulombs of integrated current were then recorded. The control potential was immediately reset at −0.35 volt and reduction allowed to proceed to the 50 microamperes cutoff current. The coulombs of current required to reach the first end point multiplied by a factor of 0.5786 to convert coulombs to milligrams equals the weight of iron in milligrams. Since the uranium is not reduced at a potential of −0.04 volt, the difference between the integrated current readings in coulombs was multiplied by a factor of 1.2331 to convert the coulombs to milligrams of uranium titrated.

In order to evaluate the performance of this instrument, a series of analyses was made using the reduction-reoxidation of iron in 1 N HCl at a platinum-gauze electrode, and the reduction of uranium (VI) in 1 N $H_2SO_4$ at a mercury-pool electrode. Satisfactory analytical results were obtained for both procedures. Sixteen titrations of iron in amounts ranging from 1.907 to 19.07 mg. showed an average error of +0.21 percent for reduction and +0.07 percent for reoxidation. The overall precision was ±0.13 percent for both modes of operation. The uranium analysis by coulometric reduction had an average error of +0.03 percent with the precision being ±0.19 percent for 17 samples at the 1.019 mg. level. No problems were encountered with oscillation.

Thus, it can be seen that the present coulometer has improved precision and accuracy, and overcomes the problems of drift and instability. In particular, the problem of oscillation is overcome. These and other features not described herein will become obvious to one skilled in the art without departing from the spirit and scope of this invention.

What we claim is:

1. In an improved controlled-potential coulometer comprising a cell containing a cathode, an anode and a reference electrode, means for determining the electrical output of said cell, and electronic circuitry connected to the electrodes of said cell to control the potential, the improvement which comprises interposing a capacitor between the anode and the reference electrode in the circuitry, said capacitor matching the operating characteristics of said cell.

2. The device of claim 1 in which the value of the capacitor is approximately 0.022 microfarad.

3. The device of claim 1 in which the value of the capacitor may be varied to match the opreating characteristics of the cell.

References Cited

UNITED STATES PATENTS 3,131,348   4/1964   Taylor et al. _____ 204—195

OTHER REFERENCES

"Analytical Chemistry," vol. 29, No. 2, February 1957, pp. 219–221.

"Analytical Chemistry," vol. 31, 1959, pp. 492–494.

JOHN H. MACK, Primary Examiner

T. TUNG, Assistant Examiner

U.S. Cl. X.R.

204—1; 324—94